United States Patent
Nun et al.

(10) Patent No.: US 6,852,389 B2
(45) Date of Patent: Feb. 8, 2005

(54) SURFACES RENDERED SELF-CLEANING BY HYDROPHOBIC STRUCTURES, AND PROCESS FOR THEIR PRODUCTION

(75) Inventors: Edwin Nun, Billerbeck (DE); Markus Oles, Hattingen (DE); Bernhard Schleich, Recklinghausen (DE)

(73) Assignee: Creavis Gesellschaft fuer Technologie und Innovation mbH, Marl (DE)

( * ) Notice: Subject to any disclaimer, the term of this patent is extended or adjusted under 35 U.S.C. 154(b) by 142 days.

(21) Appl. No.: 10/120,365

(22) Filed: Apr. 12, 2002

(65) Prior Publication Data

US 2002/0150725 A1 Oct. 17, 2002

(30) Foreign Application Priority Data

Apr. 12, 2001 (DE) .......................................... 101 18 351

(51) Int. Cl.$^7$ .............................. B32B 5/16; B05D 1/12; B05D 3/02
(52) U.S. Cl. ...................... 428/143; 428/144; 428/145; 428/147; 428/148; 428/149; 428/220; 428/323; 428/327; 428/328; 428/331; 428/332; 427/199; 427/204; 427/180; 427/203; 427/201; 977/DIG. 1
(58) Field of Search ................................. 428/143, 144, 428/145, 147, 148, 149, 220, 323, 327, 328, 331, 332; 427/199, 204, 180, 203, 201; 977/DIG. 1

(56) References Cited

U.S. PATENT DOCUMENTS 5,520,856 A * 5/1996 Garrett et al. ................. 261/76
2002/0016433 A1 * 2/2002 Keller et al. .................. 528/10
2002/0045010 A1 * 4/2002 Rohrbaugh et al. ...... 427/372.2
2002/0150724 A1 * 10/2002 Nun et al. ................... 428/143
2002/0150725 A1 * 10/2002 Nun et al. ................... 428/143
2002/0150726 A1 * 10/2002 Nun et al. ................... 428/143

FOREIGN PATENT DOCUMENTS

| CH | 268258 | 5/1950 |
| DE | 199 17 367 | 10/2000 |
| DE | 100 22 246 | 11/2001 |
| FR | 2 150 474 | 4/1973 |
| GB | 1 335 957 | 10/1973 |
| GB | 2 311 527 | 10/1997 |
| WO | WO 99/36481 | 7/1999 |
| WO | WO-0039239 A * | 7/2000 |

* cited by examiner

*Primary Examiner*—William P. Watkins, III
(74) *Attorney, Agent, or Firm*—Oblon, Spivak, McClelland, Maier & Neustadt, P.C.

(57) ABSTRACT

A self-cleaning surface which has an artificial, at least partially hydrophobic, surface structure containing elevations and depressions, which comprises a surface having structure-forming particles, which are formed of hydrophobic, fumed silica, adhered thereto by way of fixative particles applied to the surface, whereby the structure-forming particles and the fixative particles have elevations and depressions ranging in dimensions of 1 to 1000 nm and the particles themselves having an average size of less than 50 μm, the particles providing said surface structure of elevations and depressions, wherein, by incipient melting of the fixative particles, only partial melting of the fixative particles occurs which is sufficient to bond the structure forming particles without substantial wetting of the particles by the fixative particles to said surface while retaining, the fissured structure of the structure-forming particles in the nanometer range.

25 Claims, 1 Drawing Sheet

SURFACES RENDERED SELF-CLEANING BY HYDROPHOBIC STRUCTURES, AND PROCESS FOR THEIR PRODUCTION

BACKGROUND OF THE INVENTION

1. Field of the Invention

The present invention relates to self-cleaning surfaces and to a process for their production.

2. Discussion of the Background

Objects with surfaces which are extremely difficult to wet have a number of commercially significant features. The feature of most commercial significance here is the self-cleaning action of low-wettability surfaces, since the cleaning of surfaces is time-consuming and expensive. Self-cleaning surfaces are therefore of very great commercial interest. The mechanisms of adhesion are generally the result of surface-energy-related parameters acting between the two surfaces which are in contact. These systems generally attempt to reduce their free surface energy. If the free surface energies between two components are intrinsically very low, it can generally be assumed that there will be weak adhesion between these two components. The important factor here is the relative reduction in free surface energy. In pairings where one surface energy is high and one surface energy is low the crucial factor is very often the opportunity for interactive effects, for example, when water is applied to a hydrophobic surface it is impossible to bring about any noticeable reduction in surface energy. This is evident in that the wetting is poor. The water applied forms droplets with a very high contact angle. Perfluorinated hydrocarbons, e.g. polytetrafluoroethylene, have very low surface energy. There are hardly any components which adhere to surfaces of this type, and components deposited on surfaces of this type are in turn very easy to remove.

The use of hydrophobic materials, such as perfluorinated polymers, for producing hydrophobic surfaces is known. A further development of these surfaces consists in structuring the surfaces in the μm to nm range. U.S. Pat. No. 5,599,489 discloses a process in which a surface can be rendered particularly repellent by bombardment with particles of an appropriate size, followed by perfluorination. Another process is described by H. Saito et al. in "Service Coatings International" 4, 1997, pp. 168 et seq. Here, particles made from fluoropolymers are applied to metal surfaces, whereupon a marked reduction was observed in the wettability of the resultant surfaces with respect to water, with a considerable reduction in tendency toward icing.

U.S. Pat. No. 3,354,022 and WO 96/04123 describe other processes for reducing the wettability of objects by topological alterations in the surfaces. Here, artificial elevations or depressions with a height of from about 5 to 1000 μm and with a separation of from about 5 to 500 μm are applied to materials which are hydrophobic or are hydrophobicized after the structuring process. Surfaces of this type lead to rapid droplet formation, and as the droplets roll off they absorb dirt particles and thus clean the surface.

This principle has borrowed from the natural world. Small contact surfaces reduce Van der Waals interaction, which is responsible for adhesion to flat surfaces with low surface energy. For example, the leaves of the lotus plant have elevations made from a wax, and these elevations lower the contact area with water. WO 00/58410 describes these structures and claims the formation of the same by spray-application of hydrophobic alcohols, such as 10-nonokosanol, or of alkanediols, such as 5,10-nonokosanediol. A disadvantage here is that the self-cleaning surfaces lack stability, since the structure is removed by detergents.

Another method of producing easy-clean surfaces has been described in DE 199 17 367 A1. However, coatings based on fluorine-containing condensates are not self-cleaning. Although there is a reduction in the area of contact between water and the surface, this is insufficient.

EP 1 040 874 A2 describes the embossing of microstructures and claims the use of structures of this type in analysis (microfluidics). A disadvantage of these structures is their unsatisfactory mechanical stability.

JP 11171592 describes a water-repellent product and its production, the dirt-repellent surface being produced by applying a film to the surface to be treated, the film having fine particles made from metal oxide and having the hydrolysate of a metal alkoxide or of a metal chelate. To harden this film, the substrate to which the film has been applied has to be sintered at temperatures above 400° C. The process is therefore suitable only for substrates which are stable even at temperatures above 400° C.

SUMMARY OF THE INVENTION

It is an object of the present invention to provide surfaces which are particularly effective in self-cleaning and which have structures in the nanometer range, i.e., from about 1 to about 1000 nm, and also to provide a simple process for producing self-cleaning surfaces of this type.

Another object of the present invention is to provide a process for producing self-cleaning surfaces, where the chemical or physical stresses to which the coated material are exposed are only small.

The present invention therefore provides a self-cleaning surface, which has an artificial, i.e., synthetic, at least partially hydrophobic, surface structure made from elevations and depressions, wherein the elevations and depressions are formed by structure-forming particles secured to the surface, and also by the fixative particles used for the securing process.

The present invention also provides a process for producing the above-described self-cleaning surfaces, which have an artificial, at least partially hydrophobic, surface structure made from elevations and depressions, where the elevations and depressions are formed by structure-forming particles secured to the surface, which comprises securing the structure-forming particles to the surface by using fixative particles which likewise contribute to forming the elevations and depressions.

DETAILED DESCRIPTION OF THE INVENTION

Figure 1:
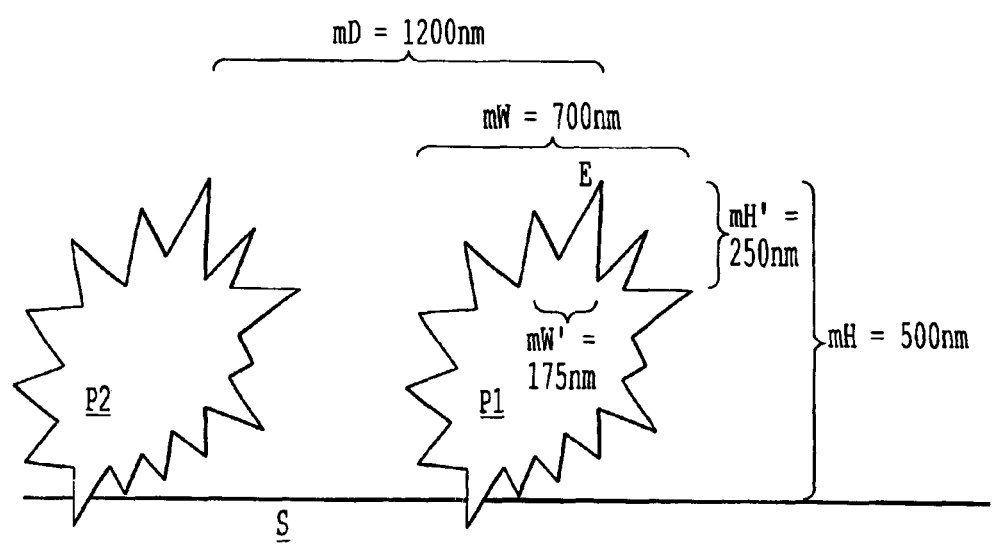
FIG. 1 is a two-dimensional schematic drawing of particles on a surface according to the present invention.

The process of the invention gives access to self-cleaning surfaces which have structure-forming particles and fixative particles, which together form the desired surface structure. The use of particles which have a fissured structure gives access, in a simple manner, to surfaces which have structuring extending into the nanometer range. In order to obtain this structure in the nanometer range, it is necessary that there is no substantial wetting of the particles by the fixative particles with which they have been secured to the surface, since otherwise the nanostructure would be lost.

The self-cleaning surfaces of the invention, and also a process for their production, are described by way of example below, but there is no intention to limit the surfaces of the invention or the process of the invention to the embodiments given by way of example.

The self-cleaning surface of the invention which has an artificial, at least partially hydrophobic, surface structure made from elevations and depressions, is distinguished by the fact that the elevations and depressions are formed by structure-forming particles secured to the surface, and also by the fixative particles used for the securing process. The structure forming particles preferably have a fissured structure with elevations and/or depressions in the nanometer range, i.e., from about 1 to about 1000 nm. The elevations and/or depressions may span any and all sub-ranges within the broad range of from about 1 to about 1000 nm. The elevations preferably have an average height of from 20 to 500 nm, particularly preferably from 50 to 200 nm. The separation of the elevations and, respectively, depressions on the particles is preferably less than 500 nm, very particularly preferably less than 200 nm. The separations of the structure-forming particles on the self-cleaning surfaces are from 0 to 10 particle diameters, in particular from 0 to 3 particles diameters and very particularly preferably from 1 to 2 particle diameters.

The fissured structures with elevations and/or depressions in the nanometer range may be formed by cavities, pores, grooves, peaks, and/or protrusions. The particles themselves have an average size of less than 50 μm, preferably less than 30 μm, and very particularly preferably less than 20 μm. The dibutyl phthalate adsorption, based on DIN 53 601, gives values of from 100 to 350 ml/100 g, preferably from 250 to 350 ml/100 g.

The fissured structures can also be characterized as craggy structures. An example of such a structure is demonstrated in FIG. 1. FIG. 1 is a two dimensional schematic figure of a structured surface S having fixed thereupon two particles P1 and P2, their approximate centers being spaced apart at a distance mD, such as 1200 nm. The particle P1 has an average size determined by a width mW, such as 700 nm and a height mH, such as 500 nm. Each of the particles has on its surface elevations E in the nanometer range, with a height mH', such as 250 nm, and a distance between elevations mW', such as 175 nm. The height and distance between depressions is analogous. Of course, a structure according to the invention will have many particles, of differing dimensions and shapes. Also, as seen from FIG. 1, there can be two kinds of elevations, the first ones prepared through the particles themselves and the second ones provided by the structured surfaces of the particles, if structured particles are used.

The structure-forming particles preferably have a BET surface area of from 50 to 600 square meters per gram. The particles very particularly preferably have a BET surface area of from 50 to 200 $m^2/g$.

The structure-forming particles used may be of a wide variety of compounds from many branches of chemistry or from the natural world. The particles preferably have at least one material selected from silicates, doped silicates, minerals, metal oxides, silicas, polymers, and coated metal powders. The particles very particularly preferably have fumed silicas or precipitated silicas, in particular Aerosils, $Al_2O_3$, $SiO_2$, $TiO_2$, $ZrO_2$, zinc powder coated with Aerosil R974, or pulverulent polymers, e.g. cryogenically milled or spray-dried polytetrafluoroethylene (PTFE).

The particles secured to the self-cleaning surfaces preferably have not only fissured structures but also hydrophobic properties. The particles here may themselves be hydrophobic, e.g. particles comprising PTFE. However, the particles secured may also have been hydrophobicized subsequently in a manner known to the skilled worker.

The fixative particles present according to the invention encompass compounds selected from the group consisting of hot-melt adhesives and/or powder coatings. These hot-melt adhesives and/or powder coatings are particularly preferably selected from the ethylene-ethyl acrylate copolymers, ethylene-vinyl acetate copolymers, polyamides, epoxy resins, polyether sulfones, polyisobutenes, and polyvinyl butyrals. The hot-melt adhesive used as fixative is particularly preferably a copolymer made from thermoplastic polyamide with caprolactone.

The fixative particles preferably have an average size of less than 50 μm. The fixative particles preferably have an average size which corresponds to the size of the structure-forming particles. However, it can also be advantageous for the average size of the fixative particles to be smaller than that of the structure-forming particles, by from 10 to 70%, preferably from 25 to 50%.

The self-cleaning surfaces of the invention have a roll-off angle of less than 20°, particularly preferably less than 10°, the definition of the roll-off angle being that a water droplet rolls off when applied from a height of 1 cm to a flat surface resting on an inclined plane. The advancing angle and the receding angle are preferably above 140°, particularly preferably above 150°, and have less than 10° of hysteresis.

Depending on the fixative particles used, and on the size and material of the structure-forming particles used, it is possible to obtain semitransparent self-cleaning surfaces. The surfaces of the invention may particularly be contact-transparent, i.e. when a surface of the invention is produced on an object on which there is writing, this writing remains legible if its size is adequate. The finer the particles used, the better the transparency of the self-cleaning surfaces.

The self-cleaning surfaces of the invention are preferably produced by the process of the invention, intended for producing these surfaces. This process of the invention for producing self-cleaning surfaces, which have an artificial, at least partially hydrophobic, surface structure made from elevations and depressions, where the elevations and depressions are formed by structure-forming particles secured to the surface, is distinguished by the fact that the structure-forming particles are secured to the surface by using fixative particles which likewise contribute to formation of the elevations and depressions.

The structure-forming particles used are preferably those which comprise at least one material selected from silicates, doped silicates, minerals, metal oxides, silicas, and polymers. The particles very particularly preferably comprise fumed silicates or silicas, in particular Aerosils, $Al_2O_3$, $SiO_2$, $TiO_2$, $ZrO_2$, Zn powder coated with Aerosil R974, or pulverulent polymers, e.g. cryogenically milled or spray-dried polytetrafluoroethylene (PTFE).

It is preferable to use particles which have fissured structures with elevations and/or depressions in the nanometer range. This method gives access to self-cleaning surfaces which have particularly good self-cleaning performance. It is particularly preferably to use particles with a BET surface area of from 50 to 600 $m^2/g$. It is very particularly preferable to use particles which have a BET surface area of from 50 to 200 $m^2/g$.

The particles for generating the self-cleaning surfaces preferably have not only the fissured structures but also hydrophobic properties. The particles may themselves be hydrophobic, e.g. particles comprising PTFE, or the particles used may have been hydrophobicized. The hydrophobicization of the particles may take place in a manner known to the skilled worker. Examples of typical hydrophobicized particles are commercially available fine powders, such as Aerosil VPR411, Aerosil R974, or Aerosil R8200 (Degussa AG).

The fixatives used as fixative particles are preferably compounds selected from the group consisting of hot-melt adhesives and/or powder coatings. These hot-melt adhesives and/or powder coatings preferably comprise at least one compound selected from the ethylene-ethyl acrylate copolymers, ethylene-vinyl acetate copolymers, polyamides, polyether sulfones, polyisobutenes, epoxy resins, and polyvinyl butyrals.

The steps encompassed by the process of the invention are preferably a) applying fixative particles and structure-forming particles to a surface, and b) incipient melting of the fixative particles to secure the structure-forming particles and the fixative particles to the surface.

The fixative particles and structure-forming particles may be applied one after the other, for example. The fixative particles are usually applied to the surface first, followed by the structure-forming particles. Incipient melting of the fixative particles on the surface prior to application of the structure-forming particles can be advantageous, and incipient melting (or incipient sintering) here is the agglutination of fixative particles at their points of contact.

In one particularly preferred embodiment of the process of the invention, a mixture of fixative particles and structure-forming particles is prepared and then applied to the surface. The structure-forming particles used for preparing the mixture made from structure-forming particles and fixative particles are preferably particles whose hydrophobic properties are similar to the properties of the fixative particles (mutually balanced hydrophobic properties).

The particles may be applied to the surface in a manner known to the skilled worker, e.g. by spray-application or powder-application. Depending on the use of the object provided with a self-cleaning surface, the surface may have been given a corrosion-protection coating, or a color coating or a coating for warning purposes.

The incipient melting of the invention is brought about by brief heating, and incipient melting (or incipient sintering) here is softening of the fixative particles in such a way that cooling produces at least some mutual adhesion of the surface of the fixative particles to adjacent surfaces of fixative particles, and/or to structure-forming particles, and also to the surface of the object which is to be provided with a self-cleaning surface. The adhesion may have been produced by chemical bonding, or else by physical forces.

The selection of the temperature at which the incipient melting is carried out, and also of the duration of the incipient melting, should be such that there is only partial melting of the fixative particles, and that the structure of the structure-forming particles, in particular the structure in the nanometer range, is retained.

The heating may take place in a manner known to the skilled worker, e.g. by means of an oven or of some other heat source. The heating preferably takes place by means of infrared radiation. However, it can also be advantageous for a mixture made from at least fixative particles and structure-forming particles, or for the fixative particles alone, to be applied to a heated surface, which is cooled after the application process. This may be particularly advantageous when the surface of the object itself is such that the mixture applied does not remain on the surface in a stable manner. Examples of reasons for this include the geometry of the object and insufficient adhesion of the pulverulent coating agent (fixative particles or structure-forming particles) to the substrate.

The mixture used in the preferred embodiment and encompassing at least fixative particles and structure-forming particles, preferably has from 10 to 90% by weight of structure-forming particles and from 90 to 10% by weight of fixative particles. The mixture used particularly preferably comprises from 25 to 75% by weight of structure-forming particles and from 25 to 75% by weight of fixative particles. The mixtures may be prepared by simple mixing of the solids. However, the mixing process may also use mixing assemblies familiar to the skilled worker. It can be advantageous for the mixing to take place with heating, the current consumed by the mixer being monitored. When agglomeration begins, this being easy to detect from a rise in the current consumed, the mixture is recooled. The slight heating has by this time firmly bonded the structure-forming particles at least partially to the fixative particles, but without surrounding the structure-forming particles by the molten fixative, since this would result in loss of the structure of the structure-forming particles in the nanometer range.

The advantage of heating the particles during mixing is that agglomeration produces larger particles in the mixture mentioned, and these are easier to process, since when the mixture is applied to the surface by spraying-application or powder-application it is possible very substantially to eliminate dusting, and there is no longer any opportunity for separation resulting from mechanical effects, e.g. density differences between fixative particles and structure-forming particles.

The fixative particles used according to the invention preferably have an average size of less than 50 $\mu$m. The fixative particles preferably have an average size which corresponds to the size of the structure-forming particles. However, it can also be advantageous for the average size of the fixative particles to be smaller than that of the structure-forming particles, by from 10 to 70%, preferably from 25 to 50%.

If hydrophilic structure-forming particles are used with hydrophilic fixative particles for producing the self-cleaning surface structure, this is treated with at least one compound from the group consisting of the alkylsilanes, alkyldisilazanes, waxes, paraffins, fatty esters, fluorinated and/or functionalized alkanes, and perfluoroalkylsilanes, in order to give the self-cleaning surface hydrophobic properties. The manner of the treatment is preferably that the surface comprising the particles and intended to be hydrophobicized is dipped into a solution which comprises a hydrophobicizing reagent, e.g. alkylsilanes, excess hydrophobicizing reagent is allowed to drip off, and the surface is annealed at the highest possible temperature.

However, the treatment may also be carried out by spraying the surface with a medium comprising a hydrophobicizing reagent, followed by annealing. A treatment of this type is preferred for treating steel beams or other heavy or bulky objects, for example. The limitation on the temperature arises from the softening points of the fixatives, of the structure-forming particles, and of the substrate to which the self-cleaning surface has been applied.

The process of the invention gives excellent results in the production of self-cleaning surfaces on planar or non-planar objects, in particular on non-planar objects. This is possible only to a limited extent with the conventional process. In particular, processes in which prefabricated films are applied to a surface and processes in which the intention is to produce a structure by embossing are not capable, or have only very limited capability, for use on non-planar objects, e.g. sculptures. However, the process of the invention may, of course, also be used to produce self-cleaning surfaces on objects with planar surfaces, e.g. greenhouses or public conveyances. The use of the process of the invention for producing self-cleaning surfaces on greenhouses has particular advantages, since the process can also produce self-cleaning surfaces on transparent materials, for example, such as glass or Plexiglas®, and the self-cleaning surface can be made transparent at least to the extent that the amount of sunlight which can penetrate the transparent surface equipped with a self-cleaning surface is sufficient for the growth of the plants in the greenhouse. Greenhouses which have a surface of the invention can be operated with intervals between cleaning which are longer than for conventional greenhouses, which have to be cleaned regularly to remove leaves, dust, lime, and biological material, e.g. algae.

The process of the invention may also be used advantageously for providing load-bearing or non-load-bearing elements of buildings, above ground level, with self-cleaning surfaces, very particularly if the surface has corrosion protection, a signal marking, as is the case on warning panels with yellow and black stripes, or has a color coating. This can prevent long lasting soiling of these elements, and thus increase the intervals between cleaning and make colored signage lastingly visible without impairment by soiling.

In addition, the process of the invention can be used for producing self-cleaning surfaces on non-rigid surfaces of objects, e.g. umbrellas or other surfaces required to be flexible. The process of the invention may very particularly preferably be used for producing self-cleaning surfaces on flexible or inflexible partitions in the sanitary sector, examples of partitions of this type are partitions dividing public toilets, partitions of shower cubicles, of swimming pools, or of saunas, and also shower curtains (flexible partition).

The examples below are intended to provide further description of the surfaces of the invention and the process for producing the surfaces, without limiting the invention to these embodiments.

EXAMPLE 1

A mixture composed of 50% by weight of Aeroperl 90/30 from Degussa AG, a spray-dried fumed silica with a BET surface area of 90 $m^2/g$ and 50% by weight of polyamide hot-melt adhesive powder (Vestamelt P06, Degussa AG) with an average particle size below 50 $\mu m$ is spray-applied electrostatically to a polymethyl methacrylate (PMMA) sheet of thickness 2 mm. To secure the particles to the sheet and produce a fissured structure, the sheet is annealed for 5 min at 108° C. The sheet is then treated with Antispread® (Dr. Tillwich GmbH), a surface-hydrophobicizing agent, making the particles and, respectively, the surface hydrophobic. The surface was first characterized visually and recorded as +++, meaning that there is virtually complete formation of water droplets. The advance angle and receding angle were each measured as greater than 150°. The associated hysteresis is below 10°.

EXAMPLE 2

A powder coating (FREOPOX EKP-7, Emil Frei GmbH & Co.) was doctor-applied cold to give a layer of 200 $\mu m$ thickness on a nickel plate, and sprinkled with a hydrophobic Aerosil (R 8200, Degussa AG). This mixture and the nickel plate were exposed for 3 minutes to a temperature of 180° C. After cooling, there was only a slight improvement in the run-off behavior of water.

EXAMPLE 3

The experiment of Example 2 was repeated, but a metal roller was used to press the Aerosil R 8200 into the molten surface coating. The material was post-annealed, again for 3 minutes. The run-off behavior of the cooled sheet was only slightly improved over that of the pure powder coating.

EXAMPLE 4

The experiment of Example 2 was repeated, but a hot-melt adhesive (Vestamelt P 06, Degussa AG) was used instead of the powder coating. After cooling there was only a slight improvement in the run-off behavior of water.

EXAMPLE 5

The experiment of Example 2 was repeated. A hydrophilic silica (Sipernat 350, Degussa AG) was used instead of the hydrophobic Aerosil R 8200. Subsequent hydrophobicization by means of a hydrophobicizing reagent (Antispread®, Dr. Tillwich GmbH) was carried out after the sheet had cooled. This example showed full development of the lotus effect.

It can be seen from Examples 2 to 5 that bonding of the structure-former to the matrix is impeded if the fixative particles (powder coating or hot-melt adhesive) and the structure-forming particles (Aerosil R8200) differ in their hydrophobic properties. The bonding is not impeded when a more hydrophilic precipitation silica (Sipernat 350) is used, and the structure-former sinters firmly to the powder coating particles or adhesive particles.

COMPARATIVE EXAMPLE 1

20% by weight of methyl methacrylate, 20% by weight of pentaerythritol tetraacrylate, and 60% by weight of hexanediol dimethacrylate were mixed together. Based on this mixture, 14% by weight of Plex 4092 F, an acrylic copolymer from Röhm GmbH and 2% by weight of Darokur 1173 UV curing agent were added, and the mixture stirred for at least 60 min. This mixture was applied as carrier at a thickness of 200 $\mu m$ to a PMMA sheet of thickness 2 mm. The layer was dried partially, for 5 min. A suspension of 10% by weight of spray-dried fumed silica, Aeroperl 90/30 Degussa AG, a silica with a BET surface area of 90 $m^2/g$, in ethanol, was doctor-applied to this layer, which had been partially dried. The assessment of the surface after curing in UV light and treatment with the hydrophobicizing agent Dynasilan 8262 is only +, i.e. there is poor droplet formation and the droplet adheres to the surface until high angles of inclination have been reached.

The poor lotus effect in the comparative example is attributable to filling-in of the fissured structures. This takes place by way of solution of monomers in ethanol. Prior to curing, the ethanol evaporates and the curing agent preferentially remains behind in the fissured structures.

The disclosure of German priority patent application 10118351.8, filed Apr. 12, 2001, is hereby incorporated by reference.

What is claimed is:
1. A self-cleaning surface which has an artificial, at least partially hydrophobic, surface structure containing elevations and depressions, which comprises:

a surface having structure-forming particles, which are formed of hydrophobic, fumed silica, adhered thereto by way of fixative particles applied to the surface, whereby the structure-forming particles and the fixative particles have elevations and depressions ranging in dimensions of 1 to 1000 nm and the particles themselves having an average size of less than 50 µm, the particles providing said surface structure of elevations and depressions, wherein, by incipient melting of the fixative particles, only partial melting of the fixative particles occurs which is sufficient to bond the structure forming particles without substantial wetting of the particles by the fixative particles to said surface while retaining, the fissured structure of the structure-forming particles in the nanometer range.

2. The self-cleaning surface as claimed in claim 1, wherein the fixative particles comprise compounds selected from the group consisting of hat-melt adhesives, powder coatings, and mixtures thereof.

3. The self-cleaning surface as claimed in claim 2, wherein the compounds are selected from the group consisting of ethylene-ethyl acrylate copolymers, epoxy resins, ethylene-vinyl acetate copolymers, polyamides, polyether sulfones, polyisobutenes and polyvinyl butyrals.

4. The self-cleaning surface as claimed in claim 1, wherein the. structure-forming particles and the fixative particles each have an average size of less than 30 µm.

5. A process for producing self-cleaning surfaces as claimed in claim 1, which comprises: securing the structure-forming particles, which are formed of hydrophobic, fumed silica, to the surface with the fixative particles.

6. The process as claimed in claim 5, which comprises a) applying the fixative particles and the structure-forming particles to the surface, and b) incipient melting of the fixative particles to secure the structure-forming particles and the fixative particles to the surface.

7. The process as claimed in claim 6, wherein the application of fixative particles is conducted by spray-application or powder-application.

8. The process as claimed in claim 6, wherein the melting of the fixative particles is conducted by heating.

9. The process as claimed in claim 7, wherein the heating of the fixative particles is conducted by infrared radiation.

10. The process as claimed in claim 5, wherein the structure-forming particles and the fixative particles comprise particles whose average size is less than 50 µm.

11. The process as claimed in claim 6, wherein in step a), a mixture made from structure-forming particles and fixative particles is applied to the surface.

12. The process as claimed in claim 11, wherein the mixture comprises from 25 to 75% by weight of the structure-forming particles and from 25 to 75% by weight of the fixative particles.

13. The process as claimed in claim 6, wherein the fixative particles comprise compounds selected from the group consisting of hot-melt adhesives, powder coatings, and mixtures thereof.

14. The process as claimed in claim 13, wherein the compounds are at least one compound selected from the group consisting of ethylene-ethyl acrylate copolymers, ethylene-vinyl acetate copolymers, epoxy resins, polyamides, polyether sulfones, polyisobutenes, and polyvinyl butyrals.

15. The process as claimed in claim 6, wherein the fixative particles have an average size of less than 50 µm.

16. The process as claimed in claim 6, wherein the surface stucture is made at least partially hydrophobic after the particles have been secured.

17. The process as claimed in claim 16, wherein the surface structure is made at least partially hydrophobic by treatment with at least one compound selected from the group consisting of alkylsilanes, perfluoroalkylsilanes, alkyldisilazanes, waxes, paraffins, fatty esters, fluorinated and functionalized alkanes.

18. The process as claimed in claim 7, wherein the self-cleaning surfaces are on planar or non-planar objects.

19. The process as claimed in claim 6, wherein the self-cleaning surfaces comprise non-rigid surfaces of objects.

20. The process as claimed in claim 6, wherein the self-cleaning surfaces are on flexible or inflexible sanitary partitions.

21. The process as claimed in claim 6, wherein the self-cleaning surfaces are on corrosion-protected elements in buildings above ground level.

22. The self-cleaning surface as claimed in claim 1, wherein said self-cleaning surface has a roll-off angle of less than 20° C.

23. The self-cleaning surface as claimed in claim 1, wherein the structure-forming particles have elevations and depressions ranging in dimensions of 20 to 500 nm.

24. The self-cleaning surface as claimed in claim 1, wherein the structure-forming particles have elevations and depressions ranging in dimensions of 50 to 200 nm.

25. A self-cleaning surface which has an artificial, at least partially hydrophobic, surface structure containing elevations and depressions, which comprises:

a surface having structure-forming particles comprised of at least one material selected from the group consisting of silicates, doped silicates, minerals, metal oxides, silicas, polymers and metal powders adhered thereto by way of fixative particles formed of a compound selected from the group consisting of ethylene-ethyl acrylate copolymers, epoxy resins, ethylene-vinyl acetate copolymers, polyamides, polyether sulfones, polyisobutenes and polyvinyl butyrals applied to the surface, whereby the structure-forming particles and the fixative particles have elevations and depressions ranging in dimensions of 1 to 1000 nm and the particles themselves having an average size of less than 50 µm, the particles providing said surface structure of elevations and depressions, wherein, by incipient melting of the fixative particles, only partial melting of the fixative particles occurs which is sufficient to bond the structure forming particles to said surface while retaining the fissured structure of the structure-forming particles in the nanometer range.

* * * * *